(12) United States Patent
Eltawil et al.

(10) Patent No.: US 10,256,864 B2
(45) Date of Patent: *Apr. 9, 2019

(54) FULL-DUPLEX SELF-INTERFERENCE CANCELLATION SYSTEMS

(71) Applicant: The Regents of the University of California, Oakland, CA (US)

(72) Inventors: Ahmed Mohamed Eltawil, Oakland, CA (US); Elsayed A. Ahmed, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/443,430

(22) Filed: Feb. 27, 2017

(65) Prior Publication Data

US 2017/0170948 A1    Jun. 15, 2017

Related U.S. Application Data

(63) Continuation of application No. 14/576,297, filed on Dec. 19, 2014, now Pat. No. 9,602,157.

(Continued)

(51) Int. Cl.
*H04B 1/525* (2015.01)
*H04L 5/14* (2006.01)
(Continued)

(52) U.S. Cl.
CPC ............. *H04B 1/525* (2013.01); *H04B 1/123* (2013.01); *H04B 1/44* (2013.01); *H04L 5/1461* (2013.01)

(58) Field of Classification Search
CPC ........ H04B 1/123; H04B 1/1461; H04B 1/44; H04B 1/525
See application file for complete search history.

(56) References Cited

U.S. PATENT DOCUMENTS

2006/0030277 A1  2/2006  Cyr et al.
2006/0262841 A1  11/2006 Vaisanen et al.
(Continued)

OTHER PUBLICATIONS

A. Balatsoukas-Stimming et al., "On Self-interference Suppression Methods for Low-complexity Full-duplex MIMO," Asilomar Conference on Signals, Systems and Computers, Nov. 2013. Available: http://infoscience.epfl.ch/record/191294.

(Continued)

*Primary Examiner* — Gary Mui
(74) *Attorney, Agent, or Firm* — Thomas | Horstemeyer, LLP; David R. Risley; Jason M. Perilla (57) ABSTRACT

Embodiments of full-duplex self-interference cancellation systems are described. In one embodiment, a full-duplex transceiver includes a digital signal processor that processes digital signals, a transmit chain that receives a first digital baseband signal from the digital signal processor and converts it to a first RF signal, a receive chain that receives a second RF signal and converts the second RF signal to a second digital baseband signal, and an auxiliary receive chain that receives a portion of the first RF signal and converts it to an auxiliary digital baseband signal. The transceiver may further include a self-interference canceller that applies a channel transfer function to the auxiliary digital baseband signal to generate a cancellation signal and subtracts the cancellation signal from the second digital baseband signal to cancel self-interference at the transceiver. The suppression of self-interference in the transceiver assists the transceiver to achieve higher efficiency in full-duplex communications.

20 Claims, 7 Drawing Sheets

Related U.S. Application Data (60) Provisional application No. 61/988,556, filed on May 5, 2014.

(51) Int. Cl.
  *H04B 1/12* (2006.01)
  *H04B 1/44* (2006.01)

(56) References Cited

U.S. PATENT DOCUMENTS

| | | |
|---|---|---|
| 2008/0198074 A1 | 8/2008 | Walton et al. |
| 2009/0130990 A1 | 5/2009 | Rofougaran |
| 2009/0185510 A1 | 7/2009 | Elahi et al. |
| 2009/0186582 A1 | 7/2009 | Muhammad et al. |
| 2010/0232324 A1 | 9/2010 | Radunovic et al. |
| 2013/0114468 A1 | 5/2013 | Hui et al. |
| 2013/0301484 A1 | 11/2013 | Khandani |
| 2013/0301487 A1 | 11/2013 | Khandani |
| 2013/0301488 A1 | 11/2013 | Hong et al. |
| 2013/0301747 A1 | 11/2013 | Khandani |
| 2014/0050124 A1 | 2/2014 | Yang et al. |
| 2014/0269449 A1 | 9/2014 | Abramsky et al. |
| 2014/0348018 A1 | 11/2014 | Bharadia et al. |
| 2014/0348032 A1 | 11/2014 | Hua et al. |
| 2015/0092621 A1 | 4/2015 | Jalloul et al. |
| 2015/0236750 A1 | 8/2015 | Choi et al. |
| 2015/0311985 A1 | 10/2015 | Kim et al. |

OTHER PUBLICATIONS

A. Sahai et al., "On the Impact of Phase Noise on Active Cancelation in Wireless Full-Duplex," Vehicular Technology, IEEE Transactions on, vol. 62, No. 9, pp. 4494,4510, Nov. 2013.

B. Radunovic et al., "Rethinking indoor wireless Mesh Design: Low power, low frequency, full duplex," Wireless Mesh Networks (WIMESH 2010), 2010 Fifth IEEE Workshop on, pp. 1-6, Jun. 2010.

Bharadia et al., Full Duplex Radios, SIGCOMM'13, Aug. 12-16, 2013, Hong Kong, China.

C. Anderson et al., "Antenna isolation, wideband multipath propagation measurements, and interference mitigation for on-frequency repeaters," SoutheastCon, 2004. Proceedings. IEEE, Mar. 26-29, 2004.

D. Bharadia et al., "Full Duplex Radios, " in ACM SIGCOMM, Aug. 2013.

D.W. Bliss et al., "Hardware phenomenological effects on cochannel full-duplex MIMO relay performance," Signals, Systems and Computers (ASILOMAR), 2012 Conference Record of the Forty Sixth Asilomar Conference on, pp. 34,39, Nov. 4-7, 2012.

E. Ahmed et al., "Rate Gain Region and Design Tradeoffs for Full-Duplex Wireless Communications," Wireless communications, IEEE Transactions on , vol. 12, No. 7, pp. 3556,3565, Jul. 2013.

E. Ahmed et al., "On Phase Noise Suppression in Full-Duplex Systems," submitted to IEEE Transactions on Wireless Communications, Jan. 2014. [Online]. Available: http://arxiv.org/abs/1401.6437.

E. Ahmed et al., "Self-Interference Cancellation with Nonlinear Distortion Suppression for Full-Duplex Systems," to appear Asilomar Conference on Signals, Systems and Computers, Nov. 2013. [Online]. Available: http://arxiv.org/abs/1307.3796.

E. Ahmed et al., "Self-Interference Cancellation with Phase Noise Induced ICI Suppression for Full-Duplex Systems," to appear Global Telecommunications Conference (GLOBECOM 2013), Dec. 2013. [Online]. Available: http://arxiv.org/abs/1307.4149.

E. Ahmed et al., "Simultaneous Transmit and Sense for Cognitive Radios Using Full-duplex: A First Study," 2012 IEEE International Symposium on Antennas and Propagation and USNC-URSI National Radio Science Meeting, 2012.

E. Everett et al., "Empowering full-duplex wireless communication by exploiting directional diversity," Signals, Systems, and Computers (ASILOMAR), 2011 Conference Record of the Forty Fifth Asilomar Conference on, pp. 2002-2006, Nov. 2011.

E. Everett et al., "Passive Self-Interference Suppression for Full-Duplex Infrastructure Nodes," Wireless Communications, IEEE Transactions on, vol. 13, No. 2, pp. 680,694, Feb. 2014.

H. Arslan et al., "Error vector magnitude to SNR conversion for nondata-aided receivers," IEEE Transactions on Wireless Communications, vol. 8, No. 5, pp. 2694-2704, May 2009.

J. I. Choi et al., "Achieving single channel, full duplex wireless communication," in MobiCom, 2010.

K. Haneda et al., "Measurement of loop-back interference channels for outdoor-to-indoor full-duplex radio relays," Antennas and Propagation (EuCAP), 2010 Proceedings of the Fourth European Conference on, pp. 12-16, Apr. 2010.

M. Duarte et al., "Design and Characterization of a Full-Duplex Multiantenna System for WiFi Networks," Vehicular Technology, IEEE Transactions on, vol. 63, No. 3, pp. 1160,1177, Mar. 2014.

M. Duarte et al., "Experiment-Driven Characterization of Full-Duplex Wireless Systems," Wireles Communications, IEEE Transactions on, vol. 11, No. 12, pp. 4296,4307, Dec. 2012.

M. Duarte et al., "Full-duplex wireless communications using off-the-shelf radios: Feasibility and first results," Signals, Systems, and Computers (ASILOMAR), 2010 Conference Record of the Forty Fourth Asilomar Conference, pp. 1558-1562, Nov. 2010.

M. Jain et al., "Practical, Real-time, Full Duplex Wireless," Proceeding of the ACM Mobicom, Sep. 2011.

M.E. Knox, "Single antenna full duplex communications using a common carrier," Wireless and Microwave Technology Conference (WAMICON), 2012 IEEE 13th Annual, pp. 15-17, Apr. 2012.

R. F. Harrington, "Reactively controlled directive arrays," submitted to IEEE Trans. Antennas Propag., vol. 26, No. 3, pp. 390-395, May 1978.

V. Syrjala et al., "Analysis of Oscillator Phase-Noise Effects on Self- Interference Cancellation in Full-Duplex OFDM Radio Transceivers," submitted to IEEE Transactions on Wireless Communications, Jan. 2014. [Online]. Available: http://arxiv.org/abs/1401.3521.

W. Slingsby et al., "Antenna isolation measurements for on-frequency radio repeaters," antennas and Propagation, 1995., Ninth International Conference on (Conf. Publ. No. 407), pp. 4-7, Apr. 1995.

Z. Li et al., "A new class of antenna array with a reconfigurable element factors," IEEE Trans. Antennas Propag., vol. 61, No. 4, pp. 1947-1955, Apr. 2013.

FULL-DUPLEX SELF-INTERFERENCE CANCELLATION SYSTEMS

CROSS-REFERENCE TO RELATED APPLICATIONS

This application is a continuation of U.S. patent application Ser. No. 14/576,297, entitled "Full Duplex Self-Interference Cancellation Systems," filed Dec. 19, 2014, which claims the benefit of U.S. Provisional Application No. 61/988,556, filed May 5, 2014, the entire contents of both of which applications are hereby incorporated herein by reference.

GOVERNMENT LICENSE RIGHTS

This invention was made with government support under grant ECCS-0955157 awarded by the National Science Foundation. The government has certain rights in the invention.

BACKGROUND

Many wireless systems operate in a half-duplex communications mode, where wireless devices are either transmitting or receiving, but not using the same temporal and spectral resources. Full-duplex communications modes may double the efficiency of bidirectional communications over the same temporal and spectral resources. In full-duplex mode, a wireless device can transmit radio frequency (RF) signals at a carrier frequency using a transmit antenna while simultaneously receiving RF signals over the same carrier frequency through a collocated receive antenna. A wireless device can also transmit RF signals at a carrier frequency using an antenna while simultaneously receiving RF signals over the same carrier frequency through the same antenna using a circulator or similar device. One limitation impacting full-duplex communications within a transceiver, however, is managing any self-interference signals imposed on the receive antenna by the transmit antenna.

BRIEF DESCRIPTION OF THE DRAWINGS

For a more complete understanding of the embodiments described herein and the advantages thereof, reference is now made to the following description, in conjunction with the accompanying figures briefly described as follows.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Due to increases in wireless data traffic, one challenge for future wireless systems is the utilization of the available spectrum to achieve better data rates. Recently, full-duplex communications, where bidirectional communications are carried out over the same temporal and spectral resources, have been introduced as a mechanism to potentially double the spectral efficiency of wireless systems. In full-duplex communications, a wireless device can transmit radio frequency (RF) signals at a carrier frequency using a transmit antenna while simultaneously receiving RF signals over the same carrier frequency through a collocated receive antenna. A wireless device can also transmit RF signals at a carrier frequency using an antenna while simultaneously receiving RF signals over the same carrier frequency through the same antenna using a circulator or similar device. Systems using full-duplex communications can be impacted by strong self-interference signals imposed by the transmit antenna on the receive antenna within the same transceiver. Thus, one limitation impacting full-duplex communications within a transceiver is managing any self-interference signals imposed on the receive antenna by the transmit antenna. Full-duplex systems may achieve substantial rate improvement over half-duplex systems when self-interference signals are mitigated.

In the context of self-interference, various examples of full-duplex systems that cancel self-interference are described herein. Additionally, general considerations associated with certain self-interference transceiver architectures are presented. For a full-duplex communications system to achieve its maximum efficiency, self-interference signals should be significantly suppressed below (or close to) the noise floor of the receiver. When the self-interference signals are not suppressed below the noise floor, self-interference power will degrade the Signal to Noise Ratio (SNR) of the system and negatively impact throughput.

In an ideal, noiseless system, the complete suppression of self-interference signals can be achieved when the information signal being transmitted is known. However, due to hardware imperfections, such as time-variant amplifier non-linearities, oscillator phase noise, thermal noise, process and circuit variations, etc., achieving high self-interference cancellation may be challenging. To a great extent, the amount of cancellable self-interference power is limited by the hardware imperfections of a system.

Self-interference cancellation techniques can be divided into three main categories: (i) passive suppression, (ii) active analog cancellation, and (iii) active digital cancellation. In passive suppression, a self-interference signal is suppressed in the propagation domain before it is processed by receiver circuitry. Passive suppression can be achieved using antenna separation and/or shielding, directional antennas, or careful antenna placement, for example. In active cancellation techniques, the signal being transmitted is referenced to cancel the self-interference signals. Active cancellation techniques can be categorized into digital or analog depending upon the domain in which self-interference is being actively canceled (e.g., digital or analog-domain). An advantage of passive suppression is that it mitigates both self-interference signals and associated noise. On the other hand, because it depends on knowledge of the transmitted signal, the performance of active cancellation techniques is typically noise limited.

As one example of an active cancellation technique, self-interference cancellation can be achieved by subtracting a copy of a transmitted signal (including noise) from a received signal after passing the transmitted signal through a filter in the radio frequency (RF) domain. Although this technique is capable of suppressing self-interference power down to nearly the noise floor, it is relatively complex to implement. See, e.g., "Systems and Methods for Cancelling Interference using Multiple Attenuation Delays" by S. Hong et al. (U.S. Patent Application Pub. No. 2013/0301488), which is hereby incorporated by reference in its entirety.

According to the embodiments described herein, an all-digital self-interference cancellation technique for full-duplex systems can be used to suppress self-interference signals. This self-interference cancellation technique is applicable for both circulator-based system architectures as well as architectures using two (or more) antennas. The self-interference cancellation technique uses an auxiliary receiver chain that shares the same oscillator with the main (or primary) receiver chain to down-convert and sample a copy of the transmitted RF signal. The sampled copy is weighted by an estimate of the wireless channel and then subtracted from the received signal. The ability to achieve significant self-interference cancellation in this way may first be attributed to the fact that the signal being subtracted is a copy of the transmitted signal which includes transmitter noise and nonlinearity effects. Second, the auxiliary receiver uses the same oscillator used by the main (or primary) receiver chain, minimizing the effect of receiver oscillator noise. Additional cancellation, using the transmitted signal can also be performed after an initial cancellation process to accommodate for the multi-path and time varying nature of the channel.

Turning to the figures, various aspects of the embodiments are described in further detail.

Figure 1:
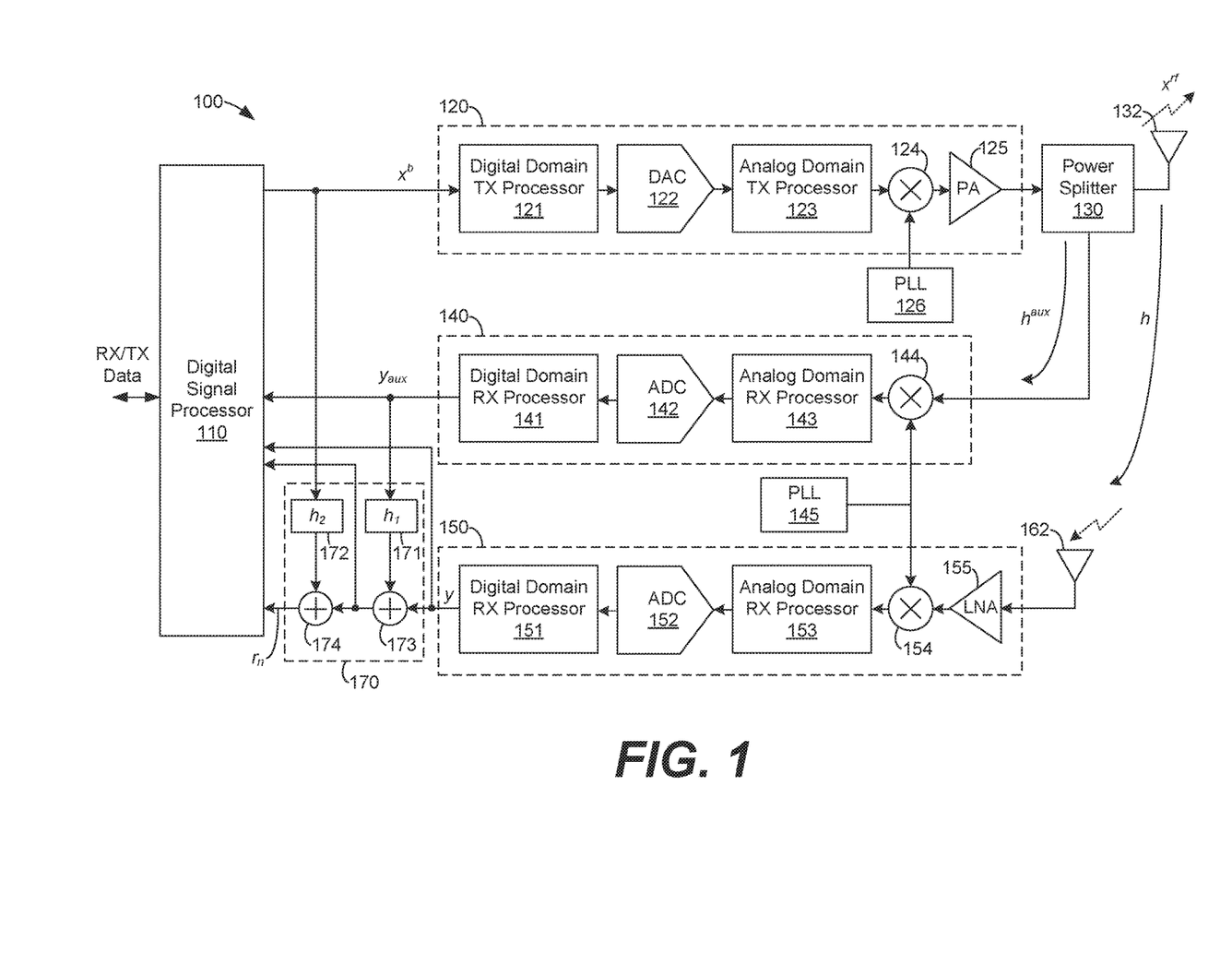
FIG. 1 illustrates an example self-interference cancellation full-duplex transceiver according to one embodiment of the present disclosure.

FIG. 1 illustrates an example self-interference cancellation full-duplex transceiver 100 according to one embodiment of the present disclosure. The transceiver 100 includes digital signal processor 110, transmit chain 120, transmit phase locked loop (PLL) oscillator 126, power splitter 130, transmit (TX) antenna 132, auxiliary receive chain 140, receive chain 150, receive PLL oscillator 145, receive (RX) antenna 162, and self-interference canceller 170. The transmit chain 120 includes digital domain TX processor 121, digital-to-analog converter (DAC) 122, analog domain TX processor 123, mixer 123, and power amplifier 125. The auxiliary receive chain 140 includes mixer 144, analog domain RX processor 143, analog-to-digital converter (ADC) 142, and digital domain RX processor 141. The receive chain 150 includes low noise amplifier (LNA) 155, mixer 154, analog domain RX processor 153, ADC 152, and digital domain RX processor 151. The self-interference canceller 170 includes first channel transfer function ($h_1$) 171, second channel transfer function ($h_2$) 172, and combiners 173 and 174.

As further described below, the digital signal processor 110 provides a modulated transmit baseband signal $x^b$ to the transmit chain 120 for RF upconversion, and the transmit chain 120 provides an upconverted transmit RF signal to the power splitter 130. The power splitter 130 splits a portion of the transmit RF signal from the transmit chain 120 and provides it to the auxiliary receive chain 140, with the remainder of the transmit RF signal being provided to the TX antenna 132 for transmission. A receive RF signal is received by the RX antenna 162 and provided to the receive chain 150. The receive chain 150 downconverts the receive RF and provides a receive baseband signal y to the self-interference canceller 170. Similarly, the auxiliary receive chain 140 downconverts the portion of the transmit RF signal and provides a baseband signal portion $y_{aux}$ to the self-interference canceller 170. The self-interference canceller 170 is configured to cancel the baseband signal portion $y_{aux}$ from the receive baseband signal y in an effort to suppress any self-interference received at the RX antenna 162 from the TX antenna 132.

The digital signal processor 110 may be embodied as any suitable processor for digital signals and is configured to modulate transmit symbols to transmit data and demodulate receive symbols to receive data. Generally, the digital signal processor 110 may be configured to modulate and demodulate data for wireless communications using any suitable digital modulation technique, such as amplitude shift keying (ASK), frequency shift keying (FSK), minimum shift keying (MSK), phase shift keying (PSK), quadrature amplitude modulation (QAM), etc., with or without the use of error coding and correction (e.g., cyclic coding, block coding, adaptive coding etc.), multiplexing (e.g., orthogonal frequency-division multiplexing (OFDM), etc.), and/or spread spectrum techniques. In this context, the digital signal processor 110 may be embodied as a general- or specific-purpose processor optimized though hardware, software, or a combination of hardware and software for digital signal processing. The digital signal processor 110 may include memory to store and execute programs (e.g., signal processing algorithms, signal filtering algorithms, etc.) and memory to store data (e.g., constellation space, symbol, bit, etc. data). Additional details regarding the structure and function of the digital signal processor 110 are described in further detail below with reference to FIG. 7.

The digital domain TX processor 121 may be embodied as any suitable signal processor for baseband data processing. In this sense, the digital domain TX processor 121 may include one or more baseband digital filters, interpolators, decimators, scalers, etc. In this context, among other functions, the digital domain TX processor 121 may be configured to filter, rate-adapt, and/or scale digital signals received from the digital signal processor 110 and, thus, prepare them for digital-to-analog conversion, upconversion, and transmission over the antenna 132 as the transmitted RF signal $x^{rf}$. The DAC 122 may be embodied as any suitable digital-to-analog converter configured to convert a digital signal to an analog signal. The analog domain TX processor 123 may be embodied as any suitable physical layer front-end circuitry for wireless data transmission. In this sense, the analog domain TX processor 123 may include one or more analog filters or other transmitter front-end circuitry. The mixer 124 upconverts the output of the analog domain TX processor 123 to a transmit RF signal using the carrier frequency signal provided from the PLL oscillator 126, and the power amplifier 125 amplifies the transmit RF signal for wireless transmission over the TX antenna 132. As the transceiver 100 operates in full-duplex mode, the transmit chain 120 may share a PLL oscillator with the receive chain 150. In other words, the PLL 126 oscillator (or the PLL 145 oscillator) may provide a reference carrier frequency signal to both the transmit chain 120 and the receive chain 150. In this case, the transmit chain 120, the receive chain 150, and the auxiliary receive chain 140 may all share a common reference carrier frequency signal.

The LNA 155 amplifies a receive RF signal provided from the RX antenna 162, and provides it to the mixer 154. The mixer 154 downconverts the receive RF signal to an analog baseband signal using the carrier frequency signal provided from the PLL oscillator 145. The analog domain RX processor 153 may be embodied as any suitable physical layer front-end circuitry for wireless data reception. In this sense, the analog domain RX processor 153 may include one or more analog filters or other receiver front-end circuitry. The ADC 152 may be embodied as any suitable analog-to-digital converter configured to convert an analog signal to a digital signal. As an output, the ADC 152 provides a digital baseband signal to the digital domain RX processor 151. The digital domain RX processor 151 may be embodied as any suitable signal processor for front-end data reception. In this sense, the digital domain RX processor 151 may include one or more digital filters, interpolators, decimators, scalers, etc. In this context, among other functions, the digital domain RX processor 151 may be configured to filter, rate-adapt, and/or scale the digital baseband signal received from the ADC 152 and provide the receive baseband signal y to the self-interference canceller 170.

In the transceiver 100, self-interference cancellation is performed in two consecutive steps. In the first cancellation step, the portion of the transmit RF signal from the power splitter 130 is fed back through the auxiliary receive chain 140. In one aspect of the embodiments, the auxiliary receive chain 140 may be embodied using the same or similar components as those in the receive chain 150. That is, the mixer 144, analog domain RX processor 143, ADC 142, and digital domain RX processor 141 of the auxiliary receive chain 140 may be selected as an image of the mixer 154, analog domain RX processor 153, ADC 152, and digital domain RX processor 151 of the receive chain 150. That is, the electrical characteristics and properties of the components of the auxiliary receive chain 140 are selected to be the same as (substantially similar to) those of the receive chain 150.

The baseband signal portion $y_{aux}$ output from the auxiliary receive chain 140 is representative of self-interference caused in part by the transmitted RF signal $x^{rf}$ being received at the RX antenna 162. Because the auxiliary receive chain 140 is representative of the receive chain 150, the baseband signal portion $y_{aux}$ has been processed in a manner similar to that of signals processed by the receive chain 150 and may be relied upon to cancel the self-interference in the transceiver 100. Particularly, in the transceiver 100, the baseband signal portion $y_{aux}$ output from the auxiliary receive chain 140 is multiplied by the $h_1$ channel transfer function 171 and then subtracted from the receive baseband signal y output from the receive chain 150. In some cases, the $h_1$ channel transfer function 171 may be estimated during a tuning phase.

In the second cancellation step, the modulated transmit baseband signal $x^b$ is multiplied by the $h_2$ channel transfer function 172 and subtracted from the output of the first cancellation step. The $h_1$ and $h_2$ channel transfer functions 171 and 172 may be embodied and implemented as digital filters having a number of taps and fixed or adaptive coefficients. The main purpose of the first cancellation step is to remove or cancel self-interference signal and associated noise due to line-of-sight (LOS) components of the channel, for example. The second cancellation step may accommodate for residual self-interference signals due to multi-path and the time varying nature of the wireless channel.

The $h_1$ channel transfer function 171 can be estimated during a tuning phase that takes place before normal full-duplex system operation. During the tuning phase, the digital signal processor 110 is configured to estimate the wireless channel h over the antennas 132 and 162 and estimate the wired channel $h^{aux}$ through the auxiliary receive chain 140. The digital signal processor 110 may determine these channel estimates over a relatively large time interval to minimize channel estimation error due to system noise. The digital signal processor 110 is further configured to calculate the $h_1$ channel transfer function 171 as a function of h and $h^{aux}$, such that $h_1 = h/h^{aux}$. On the other hand, the digital signal processor 110 is configured to estimate the $h_2$ channel transfer function 172 during normal full-duplex system operation after the first cancellation step takes place. The tuning phase interval and periodicity of estimating the $h_2$ channel transfer function 172 are all design parameters that affect performance.

Channel estimation may be performed in a variety of ways among the embodiments. For example, one way to perform channel estimation in OFDM and other systems is using the Least Square (LS) channel estimation method, where an estimate for the channel is obtained by dividing the received signal by the transmitted signal in the frequency domain. Using the LS method, the wireless channel h can be estimated as:

$$h = \frac{1}{M} \sum_{m=1}^{M} \frac{Y_m}{X_m^b}, \quad (1)$$

where Y is the frequency domain representation of the receive baseband signal y output by the receive chain 150, $X^b$ is the frequency domain representation of the transmit baseband signal $x^b$, and M is the number of the training symbols. Similarly, the wired channel $h^{aux}$ can be estimated as:

$$h^{aux} = \frac{1}{M} \sum_{m=1}^{M} \frac{Y^{aux}}{X_m^b}, \quad (2)$$

where $Y^{aux}$ is the frequency domain representation of the auxiliary receive chain 140 output signal $y_{aux}$.

Following FIG. 1, the transmitted RF signal $x^{rf}$ can be written as:

$$x^{rf}(t) = x^b(t)e^{j2\pi f_c t + \Phi^t(t)} + d(t) + n^t(t), \quad (3)$$

where $x^b$ is the baseband signal, $\Phi^t$ is the transmitter oscillator phase noise, d is the transmitter nonlinear distortion, $n^t$ is the transmitter noise, and $f_c$ is the carrier frequency. At the receiver side, the receive baseband signal y at the output of the receive chain 150 can be written as:

$$y_n = (x_n^{rf} * h_n)e^{j\Phi_n^r} + n_r + n^r = \sum_{l=0}^{L} x_{n-l}^{rf} e^{j\Phi_n^r} h_l + n^r, \quad (4)$$

where subscript n represents the sample index, * represents a convolution process, $h_n$ is the self-interference wireless channel between the antennas 132 and 162, L is the channel length, $\Phi^r$ is the receiver oscillator phase noise, $n^r$ is the primary receiver noise, and $h_l$ is the $L^{th}$ channel tap. Similarly, the baseband signal portion $y_{aux}$ at the output of the auxiliary receive chain 140 can be written as:

$$y_n^{aux}=x_n^{rf}e^{j\Phi_n^r}h^{aux}+n^{aux}, \quad (5)$$

where $h^{aux}$ is the wired channel between the transmit chain 120 and the auxiliary receive chain 140, and $n^{aux}$ is the auxiliary receiver noise.

If the ideal case is assumed, where the estimated channel $h_1$ is exactly equal to $h/h^{aux}$, then the output of the first cancellation step (u) can be written as:

$$u_n = y_n - y_n^{aux} * h1_n = y_n - x_n^{rf}e^{j\phi_n^r} * h_n - n^{aux} \quad (6)$$

$$= \sum_{l=0}^{L} x_{n-l}^{rf} h_l \left( e^{j\phi_n^r} - e^{j\phi_{n-l}^r} \right) + n^r - n^{aux}$$

$$= \sum_{l=1}^{L} x_{n-l}^{rf} h_l \left( e^{j\phi_n^r} - e^{j\phi_{n-l}^r} \right) + n^r - n^{aux}.$$

Considering equation (6), the LOS component ($h_l$, l=0) of the self-interference signal is totally eliminated in the ideal case after the first cancellation step. In full-duplex systems, due to the close proximity of transmit and receive antennas, the LOS component is the strongest component in the self-interference signal. Furthermore, using the assumption of $e^{j\Phi}=1-j\Phi$, $\Phi \ll 1$, equation (6) can be simplified as:

$$u_n=\Sigma_{l=1}^{L} x_{n-l}^{rf} h_l (j\Phi_{n-l}^r-j\Phi_n^r)+n^r-n^{aux}. \quad (7)$$

Equation (7) represents the residual self-interference after the first cancellation step. Assuming no correlation between $\Phi_{n-l}^r$ and $\Phi_n^r$, the residual self-interference power after the first cancellation step can be written as:

$$P_u=2P_{tx}P_{nlos}P_{\Phi}+2P_n, \quad (8)$$

where $P_{tx}$ is the transmitted signal power, $P_{nlos}$ is the power in the non-LOS component of the channel, $P_{\Phi}$ is the total in-band phase noise power, and $P_n$ is the receiver noise power. Considering equation (8), it can be noted that the residual self-interference power after the first cancellation step is proportional to the power of the phase noise associated with the non-LOS component of the channel, which means that the first cancellation step substantially (if not completely) eliminates the LOS component and the phase noise associated with it in the ideal case. Furthermore, because the auxiliary receive chain 140 and the receive chain 150 share the same PLL oscillator 145, there will be a correlation between $\Phi_{n-l}^r$ and $\Phi_n^r$ based on the channel length L, and thus the total power after the first cancellation step is in practice lower than the power in equation (8).

Now consider the practical case where the $h_1$ channel transfer function 171 has channel estimation error, such that $h_1=h/h^{aux}+e_h$. Typically, the channel estimation error $e_h$ is a function of two main components including noise during the estimation process and the time varying nature of the channel (e.g., the fading effect). Therefore, $e_h$ can be written as $e_h=e_{h,n}+e_{h,f}$. The noise related component $e_{h,n}$ can be reduced by averaging the estimated channel over larger time interval (e.g., a long tuning period). On the other hand, the fading related component $e_{h,f}$ can be reduced by decreasing the averaging interval (e.g., a short tuning period) or reducing the time between each tuning phase (e.g., short tuning periodicity). Therefore, minimizing the channel estimation error involves a tradeoff between the tuning period length and the tuning periodicity.

Substituting in equation (7) with the imperfect channel estimate, the residual self-interference signal after the first cancellation step can be written as:

$$u_n=\Sigma_{l=1}^{L} x_{n-l}^{rf} h_l (j\Phi_{n-l}^r-j\Phi_n^r)+n^r-n^{aux}+e_h(\Sigma_{l=0}^{L} x_{n-l}^{rf}e^{j\Phi_{n-l}^r}h_l+n^{aux}). \quad (9)$$

According to equation (9), an additional term is added to residual self-interference signal u, the power of the additional term is proportional to $P_{tx}P_{e_h}$, where $P_{e_h}$ is the power of the channel estimation error. With typical operating conditions, the channel estimation error power $P_{e_h}$ is larger than the power of the phase noise associated with the non-LOS component $P_{nlos}P_{\Phi}$, which makes the residual self-interference power limited by the channel estimation error. However, noting that $x^{rf}$ is a function of the transmitted information signal $x^b$ and that $e_{h,n}$ is constant during the normal operating mode, the effect of the channel estimation error can be reduced by obtaining an estimate for the signal $h_2=e_h h_1$ using training symbols inserted at the beginning of each data frame. This can be expressed as:

$$H_2 = \frac{U}{X^b}, \quad (10)$$

thus $$r_n = u_n - x_n^b * h_{2,n}, \quad (11)$$

where U, $X^b$, and $H_2$ are the frequency domain representations of the time domain signals u, $x^b$, and $h_2$, respectively, and $r_n$ is the residual self-interference signal after the second cancellation step. By doing so, the effect of the channel estimation error will be scaled down by $P_{\Phi}$ (assuming that the phase noise is the dominant noise component), resulting in a final residual self-interference power after second cancellation step of $P_r$, which can be written as:

$$P_r=2P_{tx}P_{nlos}P_{\Phi}+2P_n+P_{tx}P_{e_h}P_{\Phi}. \quad (12)$$

Note that as discussed with respect to equation (8), the actual residual self-interference power is smaller than equation (12) due to the correlation between $\Phi_{n-l}^r$ and $\Phi_n^r$.

The residual self-interference power $P_r$ is a function of four main factors: the power of the non-LOS component $P_{nlos}$; the phase noise power $P_{\Phi}$; the power of the channel estimation error $P_{e_h}$; and the receiver noise power $P_n$. $P_{nlos}$ is typically very small due to the roundtrip time taken by the transmitted signal to be reflected back to the receiver. $P_{\Phi}$ can be reduced by using good quality oscillators. $P_{e_h}$ can be controlled by choosing the appropriate value for the tuning period and tuning periodicity. $P_n$ is a function of the dynamic range of the ADC 152 and additive white Gaussian noise in the receiver chain 150.

Figure 2:
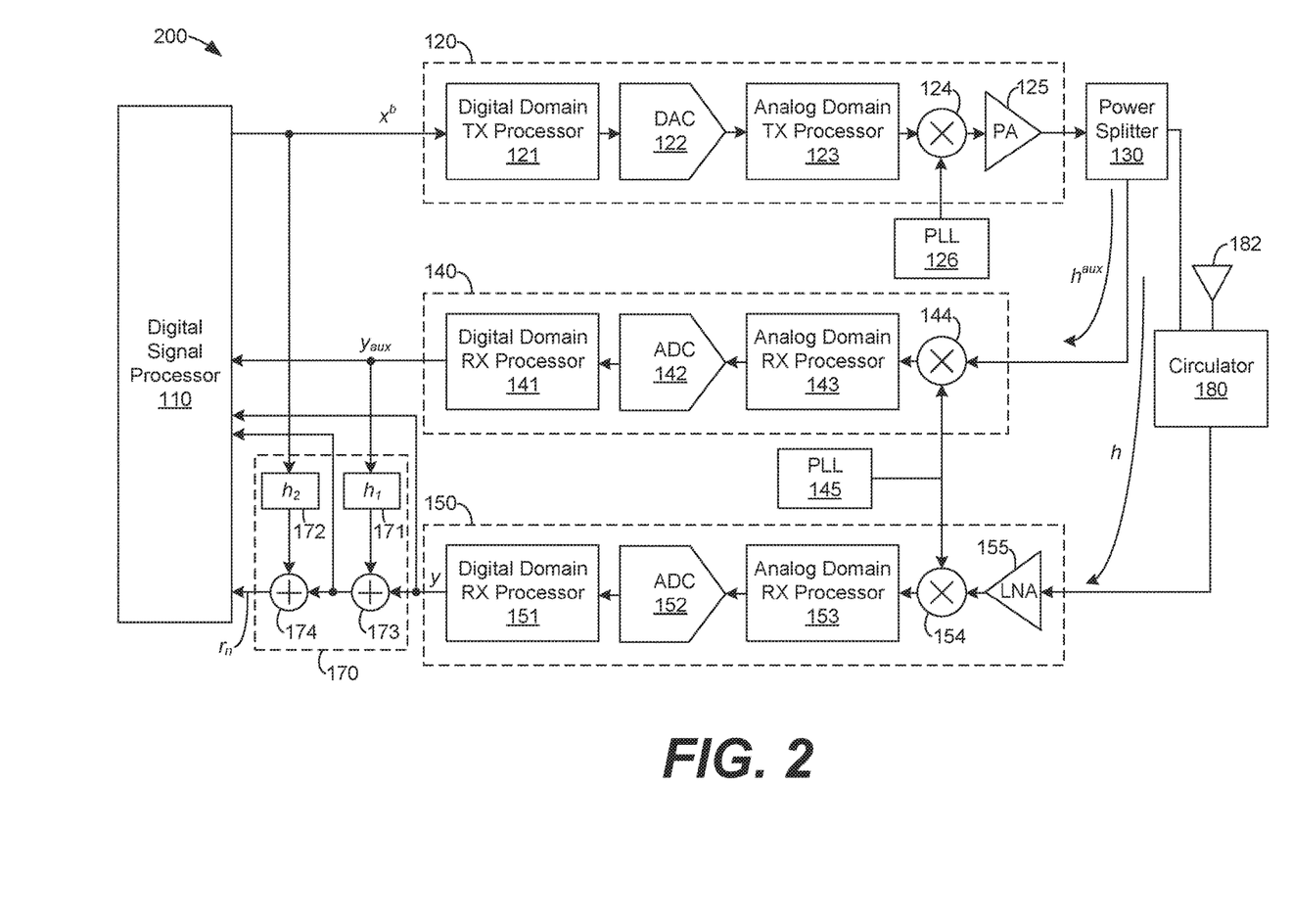
FIG. 2 illustrates an example self-interference cancellation full-duplex transceiver including a circulator according to one embodiment of the present disclosure.

In addition to the two-antenna, full-duplex transceiver 100 shown in FIG. 1, the self-interference cancellation techniques described herein can be used in circulator-based full-duplex transceivers such as the example transceiver 200 shown in FIG. 2. As compared to the transceiver 100 in FIG. 1, the transceiver 200 in FIG. 2 includes only a single antenna 182 coupled to a circulator 180. In the circulator 180, RF signals that enter at one port are rotated to the next port. The circulator 180 may be embodied as a magnetized or non-magnetized waveguide or other type of circulator. In the transceiver 200, the received self-interference power at the input of the receive chain 150 may be dominated by the circulator coupling of the circulator 180, which may be in the range of about −20 dB from the transmitted power. This relatively large self-interference power may adversely affect the dynamic range of the receive chain 150 and saturate the ADC 152, which makes the circulator-based architecture more suitable for low power applications.

In contrast, the transceiver 100 with two antennas is more suitable for high power applications due to the passive suppression that can be achieved through antenna separation or other passive suppression techniques. From the channel perspective, the transceiver 200 is expected to have a weaker non-LOS component ($P_{nlos}$) compared to the transceiver 100. This is mainly due to the round trip delay experienced when receiving the transmitted signal that was reflected back to the same antenna. The weak non-LOS component will reduce the residual self-interference power as shown in equation (12).

Figure 3:
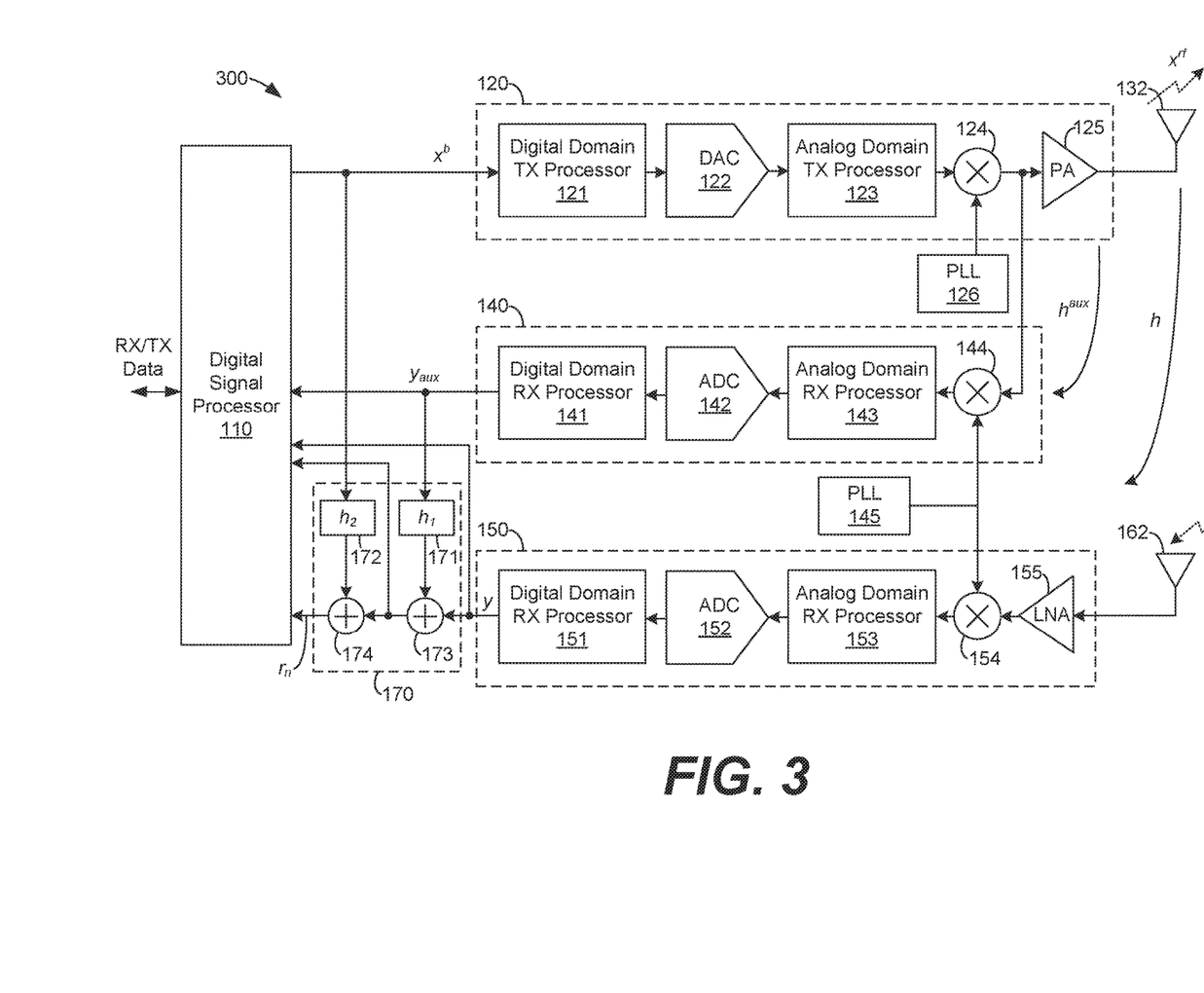
FIG. 3 illustrates an example self-interference cancellation full-duplex transceiver according to one embodiment of the present disclosure.
Figure 4:
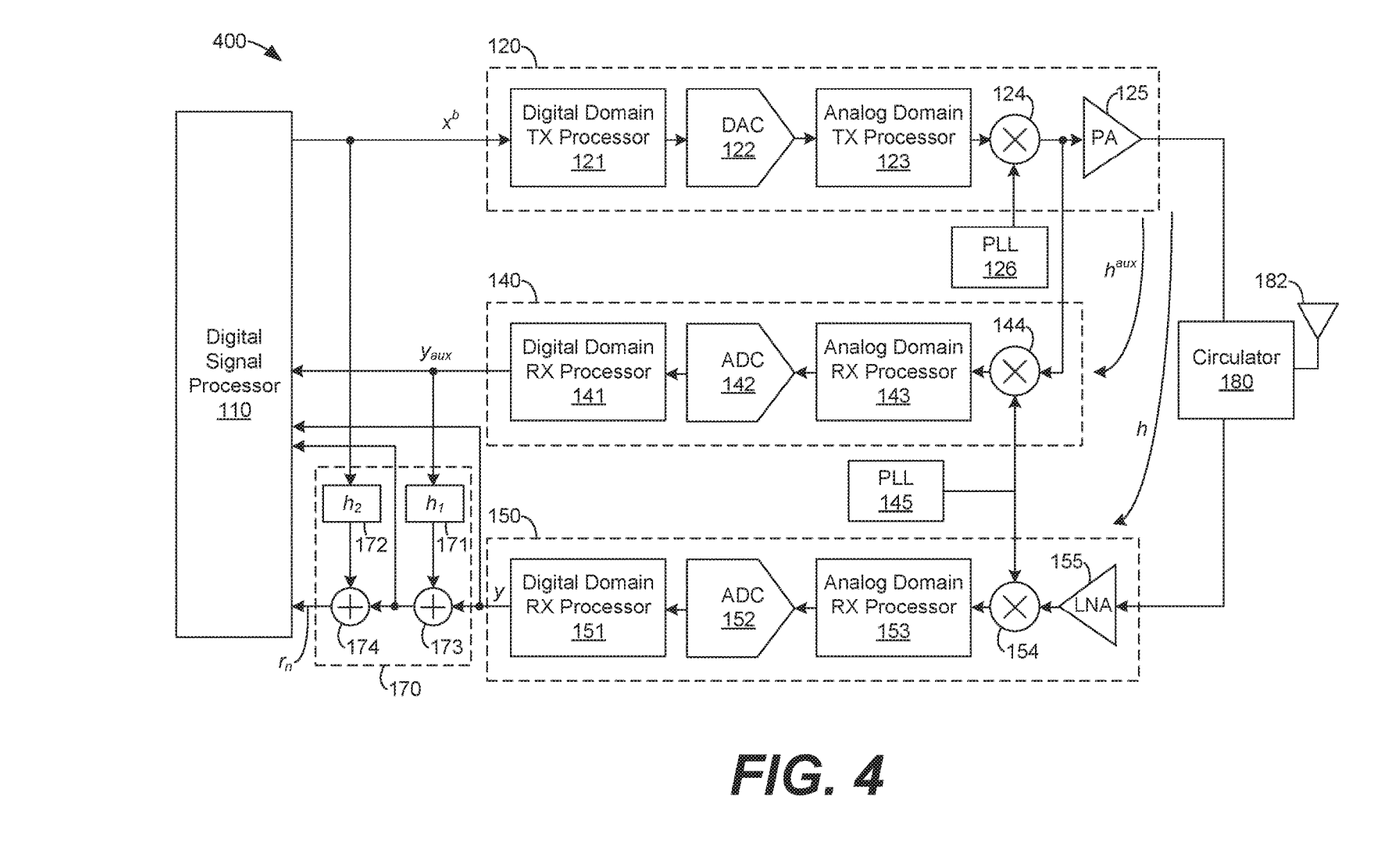
FIG. 4 illustrates an example self-interference cancellation full-duplex transceiver including a circulator according to one embodiment of the present disclosure.

Referring to FIGS. 3 and 4, shown are examples of a two-antenna full-duplex transceiver 300 and a circulator-based full-duplex transceiver 400, respectively, where the input to the auxiliary receive chain 140 is taken from the output of the mixer 124 rather than from after the power amplifier 125. The output of the mixer 124 is representative of the transmitted RF signal $x^{rf}$ (FIG. 1) for cancellation of the self-interference of the full-duplex transceivers 300 and 400. The main advantage of utilizing the output of the mixer 124 is that the efficiency of the power amplifier 125 is not affected by the power splitter 130 (FIGS. 1 and 2). On the other hand, since the feedback is taken before the power amplifier 125, the nonlinearity distortion of the power amplifier 125 will not be eliminated. Instead, a separate digital domain nonlinearity suppression algorithm can be used to eliminate the nonlinearity distortion of the power amplifier 125.

It should be emphasized that the above-described embodiments can be easily extended to transceiver embodiments with multiple transmitter and receiver chains operating either concurrently or separately, utilizing the techniques described herein. For example, two or more transmitter chains and two or more receiver chains may be included in a full-duplex transceiver. In one embodiment, the full-duplex transceiver includes first and second transmitter chains with a single primary receiver chain. A copy of the RF signal transmitted by a second transmitter chain is fed back through a second auxiliary receiver chain that shares an oscillator with the primary receiver chain. The second auxiliary receiver output is multiplied by another channel transfer function $H_1'$ that was estimated during a tuning phase. In the first cancellation step, both weighted auxiliary receiver outputs are then subtracted from the received signal from the primary receiver chain. In the second cancellation step, the base-band signal transmitted by the first transmitter chain is multiplied by a third transfer function $H_2$ and the base-band signal transmitted by the second transmitter chain is multiplied by a fourth transfer function $H_2'$; after which both are subtracted from the output of the first cancellation step. In some embodiments, signals transmitted by both transmitter chains may be fed back through a single auxiliary receiver chain and weighted by a transfer function that accounts for both transmit channels.

In another embodiment, the full-duplex transceiver includes a transmitter chain with first and second primary receiver chains that receive input RF signals. A copy of the RF signal transmitted by the transmitter chain is fed back to a second auxiliary receiver chain that shares an oscillator with the second primary receiver chain. The self-interference cancellation for the first primary receiver chain is performed with a first auxiliary receiver chain as previously described. The self-interference cancellation for the second primary receiver chain is also performed in two consecutive steps. In the first cancellation step, a copy of the transmitted RF signal is fed back through a second auxiliary receiver chain, where it is multiplied by a third channel transfer function, and then subtracted from the RF signal received from the second primary receiver chain. In the second cancellation step, the transmitted base-band signal is multiplied by a fourth transfer function and subtracted from the output of the first cancellation step for the second primary receiver chain. Other combinations of transmitter chains and receiver chains can be utilized.

Figure 5:
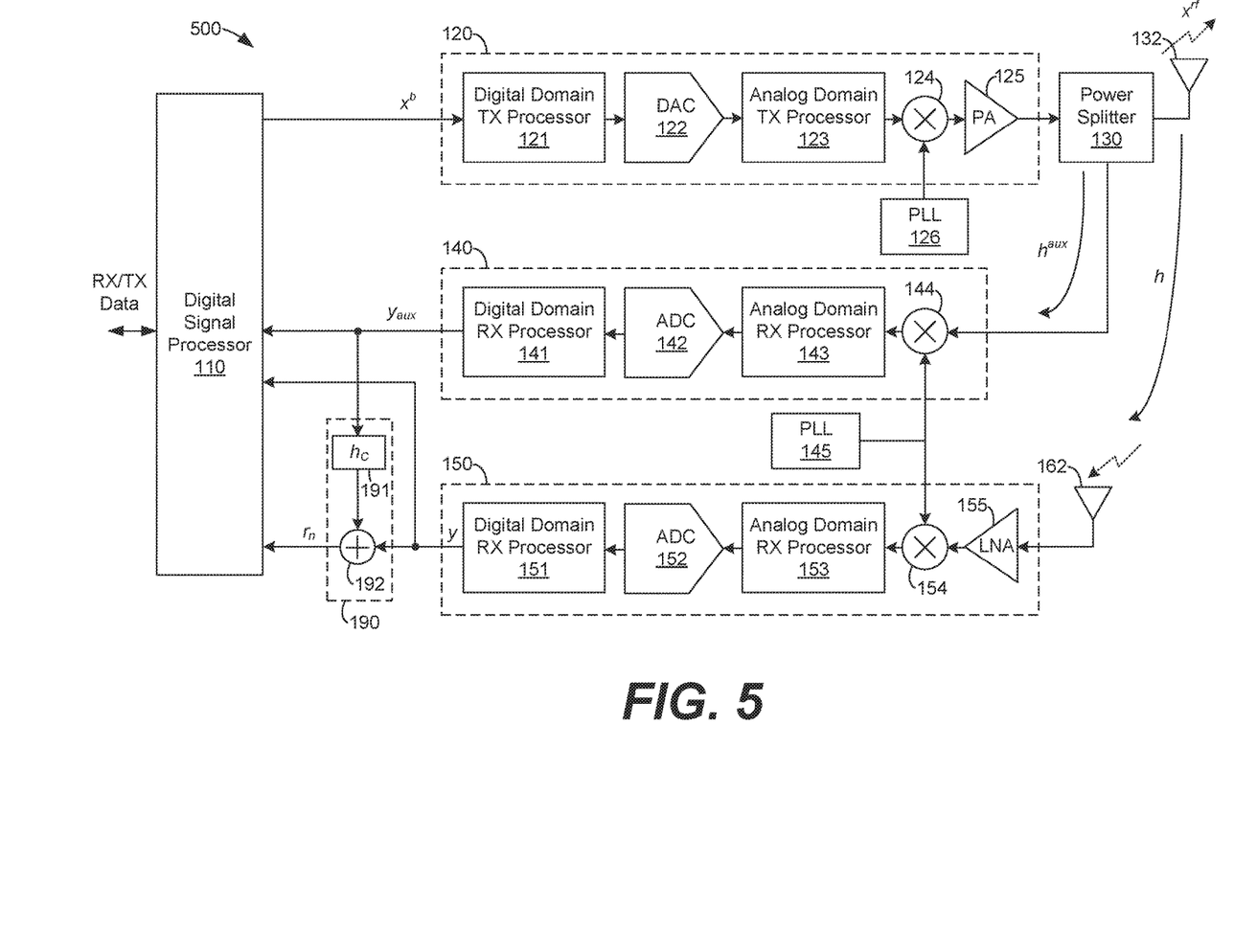
FIG. 5 illustrates an example single-step self-interference cancellation full-duplex transceiver according to one embodiment of the present disclosure.

FIG. 5 illustrates an example single-step self-interference cancellation full-duplex transceiver 500 according to one embodiment of the present disclosure. In the transceiver 500, the $y_{aux}$ output of the auxiliary receive chain 140 is multiplied by the channel transfer function $h_c$, which may be estimated during a channel estimation phase, and then subtracted from the receive baseband signal y output from the receive chain 150. The channel transfer function $h_c$ represents the composite channel quantity, such that $h_c = h/h^{aux}$. One way to obtain an estimate for the channel transfer function $h_c$ in OFDM and other systems is by dividing the received signal from the receive chain 150 by the received signal from the auxiliary receive chain 140 in the frequency domain as follows:

$$H^c = \frac{1}{M} \sum_{m=1}^{M} \frac{Y_m}{Y_m^{aux}}, \qquad (13)$$

where Y is the frequency domain representation of the receive baseband signal y, $Y^{aux}$ is the frequency domain representation of the $y_{aux}$ signal, and M is the number of the training symbols. In this case, the training interval M and the training periodicity are design parameters that affect the channel estimation quality.

Figure 6:
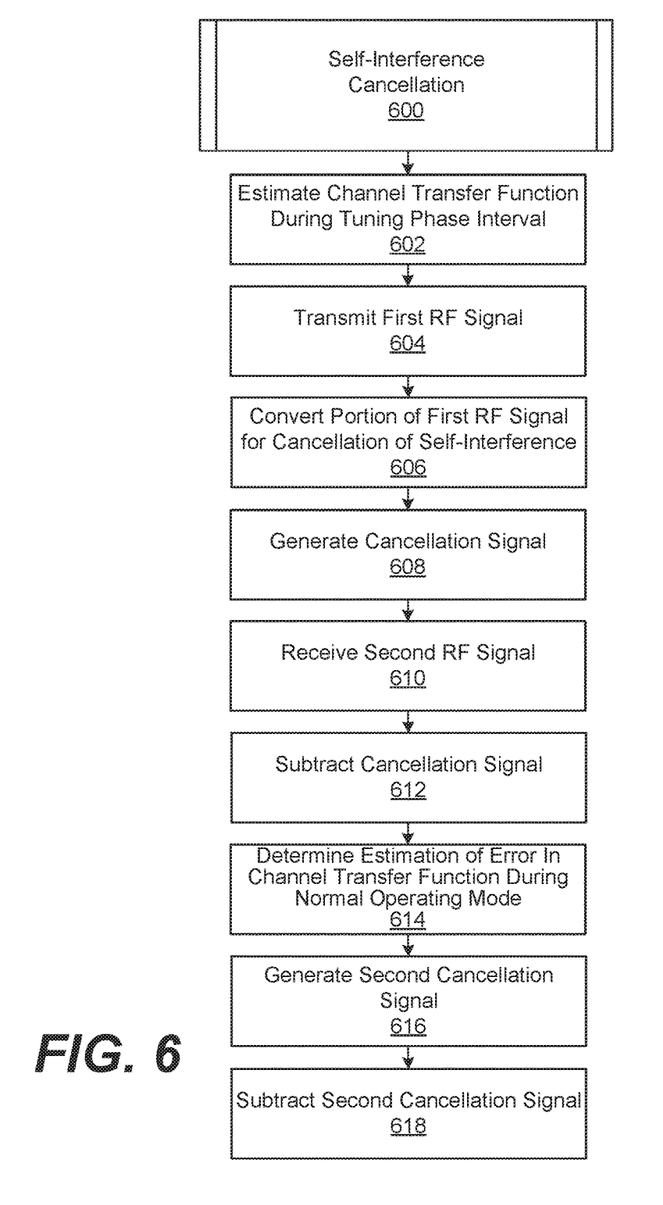
FIG. 6 illustrates a flow diagram for a self-interference cancellation process that may be performed by any of the transceivers in FIGS. 1-5 according to an example embodiment.

Before turning to the self-interference cancellation process flow diagram of FIG. 6, it is noted that the process may be practiced using an alternative order of the steps illustrated in FIG. 6. That is, the process flow is provided as an example only, and the embodiments may be practiced using process flows that differ from that illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments.

FIG. 6 illustrates a flow diagram for a self-interference cancellation process that may be performed by any of the transceivers in FIGS. 1-5 according to an example embodiment. Finally, although the process 600 in FIG. 6 is generally described in connection with the transceiver 10 in FIG. 1, the process 600 may be performed by other transceivers (e.g., the transceivers 200, 300, 400, 500 etc.).

At reference numeral 602, the process 600 includes estimating the $h_1$ channel transfer function 171 of the transceiver 100. Here, the digital signal processor 110 may estimate the $h_1$ channel transfer function 171 in any manner as described herein. For example, during a tuning phase of the transceiver 100, the digital signal processor 110 may estimate the wireless channel h over the antennas 132 and 162 and estimate the wired channel $h^{aux}$ through the auxiliary receive chain 140. The digital signal processor 110 may then calculate the $h_1$ channel transfer function 171 as a function of h and $h^{aux}$, such that $h_1 = h/h^{aux}$.

At reference numeral 604, the process 600 includes transmitting a first RF signal over a first antenna. For example, at reference numeral 604, the transmit chain 120 may receive a first digital baseband signal (e.g., the transmit baseband signal $x^b$ in FIG. 1) from the digital signal processor 110 and convert the first digital baseband signal to the first RF signal (e.g., the RF signal $x^{rf}$ in FIG. 1) for wireless transmission over a first antenna 132.

At reference numeral 606, the process 600 includes converting a portion of the first RF signal to an auxiliary digital baseband signal. Here, the auxiliary receive chain 140 of the transceiver 100 may downconvert a portion of the first RF signal transmitted at reference numeral 604 and provide the signal portion $y_{aux}$ as the auxiliary digital baseband signal (e.g., $y_{aux}$ in FIG. 1).

At reference numeral 608, the process 600 includes generating a cancellation signal by applying a channel transfer function to the auxiliary digital baseband signal. The cancellation signal may be generated by applying the $h_1$ channel transfer function 171 determined at reference numeral 602 to the auxiliary digital baseband signal $y_{aux}$ determined at reference numeral 606. A digital filter, for example, may be used to apply (e.g., through a convolution operation) the $h_1$ channel transfer function 171 to the auxiliary digital baseband signal $y_{aux}$.

At reference numeral 610, the process 600 includes receiving a second RF signal over a second antenna and converting the second RF signal to a second digital baseband signal. For example, at reference numeral 610, the receiver chain 150 may receive a signal, which may include self-interference, as the second RF signal over the antenna 162. Further, the receiver chain 150 may downconvert the second RF signal to the second digital baseband signal (e.g., the receive baseband signal y in FIG. 1).

At reference numeral 612, the process 600 includes subtracting the cancellation signal from the second digital baseband signal. For example, the self-interference canceller 170 may subtract the cancellation signal generated at reference numeral 608 from the receive baseband signal y in an effort to suppress self-interference.

At reference numeral 614, the process 600 includes determining an estimation error in the channel transfer function using training symbols inserted in frames during a normal operating mode of the transceiver. Here, the digital signal processor 110 may determine the estimation of error $e_h$ in the channel transfer function using training symbols inserted in frames during the normal operating mode of the transceiver. Subsequently, as a second channel transfer function, the digital signal processor 110 is configured to estimate the $h_2$ channel transfer function 172 as $h_2 = e_h \, h_1$, based on the estimation of error $e_h$.

At reference numeral 616, the process 600 includes generating a second cancellation signal by applying the second channel transfer function (e.g., $h_2$) to the first digital baseband signal provided by the digital signal processor 110, to generate a second cancellation signal. Again, a digital filter, for example, may be used to apply (e.g., through a convolution operation) the $h_s$ channel transfer function 172 to the baseband signal $x^b$. Finally, at reference numeral 618, the process 600 includes subtracting the second cancellation signal determined at reference numeral 616 from the the receive baseband signal y.

Figure 7:
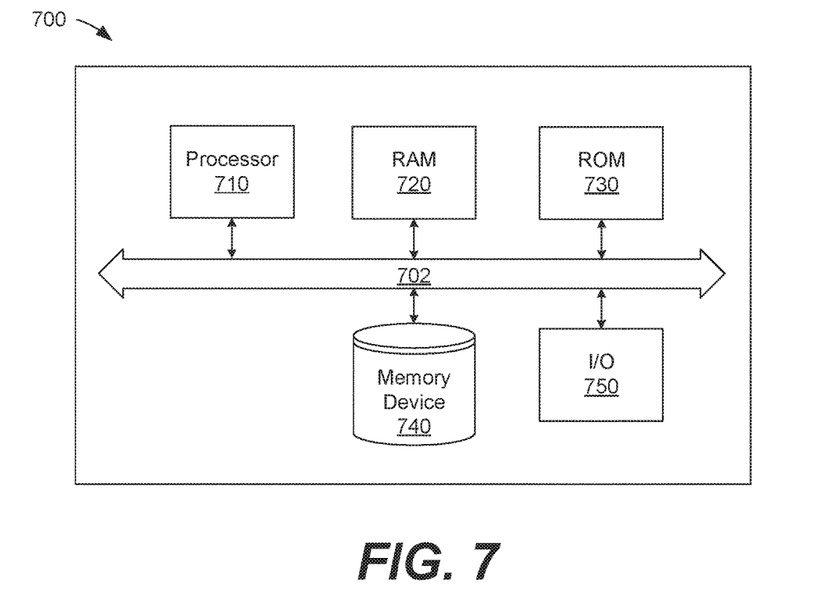
FIG. 7 illustrates an example schematic block diagram of a processing environment which may be relied upon, in part, in one or more of the transceivers in FIGS. 1-5, according to various embodiments described herein.

FIG. 7 illustrates an example schematic block diagram of a processing environment 700 which may be relied upon, in part, in one or more of the transceivers in FIGS. 1-5, according to various embodiments described herein. The processing environment 700 may form part of the digital signal processor 110, the transmit chain 120, and/or the receive chain 140 in one or more of the transceivers 100, 200, 300, 400, or 500 in FIGS. 1-5. The processing environment 700 may be embodied, in part, using one or more elements of a mixed general and/or specific purpose computer. The processing environment 700 includes a processor 710, a Random Access Memory (RAM) 720, a Read Only Memory (ROM) 730, a memory device 740, and an Input Output (I/O) interface 750. The elements of processing environment 700 are communicatively coupled via one or more local interfaces 702. The elements of the processing environment 700 are not intended to be limiting in nature, as the architecture may omit elements or include additional or alternative elements.

In various embodiments, the processor 710 may be embodied as one or more circuits, general purpose processors, state machines, ASICs, or any combination thereof. In certain aspects and embodiments, the processor 710 is configured to execute one or more software modules which may be stored, for example, on the memory device 740. The software modules may configure the processor 710 to perform the tasks undertaken by one or more of the transceivers 100, 200, 300, 400, or 500 in FIGS. 1-5. In certain embodiments, the process 600 described in connection with FIG. 6 may be implemented or executed by the processor 710 according to instructions stored on the memory device 740.

The RAM and ROM 720 and 730 may include or be embodied as any random access and read only memory devices that store computer-readable instructions to be executed by the processor 710. The memory device 740 stores computer-readable instructions thereon that, when executed by the processor 710, direct the processor 710 to execute various aspects of the embodiments described herein.

As a non-limiting example group, the memory device 740 includes one or more non-transitory memory devices, such as an optical disc, a magnetic disc, a semiconductor memory (i.e., a semiconductor, floating gate, or similar flash based memory), a magnetic tape memory, a removable memory, combinations thereof, or any other known non-transitory memory device or means for storing computer-readable instructions. The I/O interface 750 includes device input and output interfaces, such as keyboard, pointing device, display, communication, and/or other interfaces. The one or more local interfaces 702 electrically and communicatively couples the processor 710, the RAM 720, the ROM 730, the memory device 740, and the I/O interface 750, so that data and instructions may be communicated among them.

In certain aspects, the processor 710 is configured to retrieve computer-readable instructions and data stored on the memory device 740, the RAM 720, the ROM 730, and/or other storage means, and copy the computer-readable instructions to the RAM 720 or the ROM 730 for execution, for example. The processor 710 is further configured to execute the computer-readable instructions to implement various aspects and features of the embodiments described herein. For example, the processor 710 may be adapted or configured to execute the process 600 described above in connection with FIG. 6. In embodiments where the processor 710 includes a state machine or ASIC, the processor 710 may include internal memory and registers for maintenance of data being processed.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A full-duplex transceiver for radio frequency (RF) communications, comprising:
an oscillator that provides a reference carrier frequency;
a transmit chain that converts a first digital baseband signal using the reference carrier frequency to a first RF signal for wireless transmission over a first antenna;
a receive chain that receives a second RF signal over a second antenna and converts the second RF signal using the reference carrier frequency to a second digital baseband signal;
an auxiliary receive chain that receives a portion of the first RF signal from the transmit chain and converts the portion of the first RF signal to an auxiliary digital baseband signal;
a digital signal processor configured to determine a channel transfer function based on an estimate of a wireless channel between the first antenna and the second antenna; and
a self-interference canceller configured to:
generate a cancellation signal based on an application of the channel transfer function to the auxiliary digital baseband signal; and
subtract the cancellation signal from the second digital baseband signal.

2. The full-duplex transceiver of claim 1, wherein the digital signal processor is configured to determine the channel transfer function based further on an estimate of a wired channel associated with the auxiliary receive chain.

3. The full-duplex transceiver of claim 2, wherein the digital signal processor is configured to determine the channel transfer function based on a ratio of the estimate of the wireless channel and the estimate of the wired channel.

4. The full-duplex transceiver of claim 1, wherein the oscillator comprises one or more oscillators that each provides a reference carrier frequency at a same frequency for use by the transmit chain and the receive chain.

5. The full-duplex transceiver of claim 1, wherein the digital signal processor is configured to determine the channel transfer function at a predetermined tuning periodicity to reduce an estimation error in the channel transfer function.

6. The full-duplex transceiver of claim 1, wherein the digital signal processor is configured to determine estimation error in the channel transfer function using training symbols inserted in frames during a normal operating mode of the transceiver.

7. The full-duplex transceiver of claim 6, wherein:
the digital signal processor is further configured to determine a second channel transfer function based on the estimation error in the channel transfer function; and
the self-interference canceller is further configured to:
generate a second cancellation signal based on an application of the second channel transfer function to the first digital baseband signal; and
subtract the second cancellation signal from the second digital baseband signal.

8. The full-duplex transceiver of claim 7, wherein the digital signal processor is configured to determine the second channel transfer function based on the estimation error in the channel transfer function.

9. A full-duplex transceiver for radio frequency (RF) communications, comprising:
an oscillator that provides a reference carrier frequency;
a transmit chain that converts a first digital baseband signal using the reference carrier frequency to a first RF signal for wireless transmission;
a receive chain that receives a second RF signal converts the second RF signal using the reference carrier frequency to a second digital baseband signal;
an auxiliary receive chain that receives a portion of the first RF signal from the transmit chain and converts the portion of the first RF signal to an auxiliary digital baseband signal;
a digital signal processor configured to determine a channel transfer function based on an estimate of a wireless channel between the transmit chain and the receive chain; and
a self-interference canceller configured to:
generate a cancellation signal based on an application of the channel transfer function to the auxiliary digital baseband signal; and
subtract the cancellation signal from the second digital baseband signal.

10. The full-duplex transceiver of claim 9, wherein the portion of the first RF signal is provided by a power splitter.

11. The full-duplex transceiver of claim 9, wherein the portion of the first RF signal is taken from an output of a mixer in the transmit chain.

12. The transceiver of claim 9, wherein the digital signal processor is configured to determine the channel transfer function based on a ratio of the estimate of the wireless channel and an estimate of a wired channel associated with the auxiliary receive chain.

13. The full-duplex transceiver of claim 9, wherein the auxiliary receive chain converts the portion of the first RF signal to the auxiliary digital baseband signal using the reference carrier frequency.

14. The full-duplex transceiver of claim 9, wherein the digital signal processor is configured to determine the channel transfer function at a predetermined tuning periodicity to reduce an estimation error in the channel transfer function.

15. The full-duplex transceiver of claim 9, wherein the digital signal processor is configured to determine estimation error in the channel transfer function using training symbols inserted in frames during a normal operating mode of the transceiver.

16. The full-duplex transceiver of claim 15, wherein:
the digital signal processor is configured to determine a second channel transfer function based on the estimation error in the channel transfer function; and
the self-interference canceller is further configured to:
generate a second cancellation signal based on an application of the second channel transfer function to the first digital baseband signal; and
subtract the second cancellation signal from the second digital baseband signal.

17. A method of self-interference cancellation in a full-duplex transceiver, comprising:
converting, with a transmit chain, a first digital baseband signal to a first RF signal for wireless transmission using a reference carrier frequency;
receiving a second RF signal and converting, with a receive chain, the second RF signal to a second digital baseband signal using the reference carrier frequency;

converting, with an auxiliary receive chain, a portion of the first RF signal to an auxiliary digital baseband signal;

determining a channel transfer function based on an estimate of a wireless channel between the transmit chain and the receive chain;

generating a cancellation signal based on an application of the channel transfer function to the auxiliary digital baseband signal; and subtracting the cancellation signal from the second digital baseband signal.

18. The method of claim 17, further comprising determining the channel transfer function based further on an estimate of a wired channel associated with the auxiliary receive chain.

19. The method of claim 17, further comprising determining the channel transfer function during a periodic tuning phase interval of the transceiver.

20. The method of claim 17, further comprising:

determining an estimation error in the channel transfer function using training symbols inserted in frames during a normal operating mode of the transceiver;

generating a second cancellation signal based on an application of a second channel transfer function to the first digital baseband signal; and subtracting the second cancellation signal from the second digital baseband signal.

* * * * *